(12) United States Patent
Jia et al.

(10) Patent No.: US 11,208,118 B2
(45) Date of Patent: Dec. 28, 2021

(54) TRAVEL CONTROL DEVICE, TRAVEL CONTROL METHOD, AND COMPUTER-READABLE STORAGE MEDIUM STORING PROGRAM

(71) Applicant: HONDA MOTOR CO., LTD., Tokyo (JP)

(72) Inventors: Luwei Jia, Wako (JP); Nobuharu Nagaoka, Wako (JP); Tadahiko Kanoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 17/003,982

(22) Filed: Aug. 26, 2020

(65) Prior Publication Data
US 2020/0391765 A1 Dec. 17, 2020

Related U.S. Application Data

(63) Continuation of application No. PCT/JP2018/007808, filed on Mar. 1, 2018.

(51) Int. Cl.
*B60W 60/00* (2020.01)
*B60W 50/02* (2012.01)
*B60W 50/029* (2012.01)

(52) U.S. Cl.
CPC ...... *B60W 60/001* (2020.02); *B60W 50/0205* (2013.01); *B60W 50/029* (2013.01); *B60W 60/0053* (2020.02); *B60W 60/0059* (2020.02)

(58) Field of Classification Search
CPC ........... B60W 60/001; B60W 50/0205; B60W 50/029; B60W 60/0053; B60W 60/0059
See application file for complete search history.

(56) References Cited

U.S. PATENT DOCUMENTS 10,176,720 B2   1/2019 Ushiba et al.
10,479,377 B2   11/2019 Nishida
(Continued)

FOREIGN PATENT DOCUMENTS

JP   02017132290   12/1899
JP   2015206655 A   11/2015
(Continued)

OTHER PUBLICATIONS

International Search Report for PCT/JP2018/007808 dated May 1, 2018.
(Continued)

*Primary Examiner* — Alan D Hutchinson
*Assistant Examiner* — Andy Schneider
(74) *Attorney, Agent, or Firm* — Thomas | Horstemeyer, LLP

(57) ABSTRACT

A travel control device for controlling travel of a vehicle, comprises a device that acquires external information of a vehicle; a travel control unit configured to control travel of the vehicle using an acquisition result by the device; a diagnosis start unit configured to start a diagnosis process of the device; and a restriction unit configured to restrict a function of travel control of the vehicle after the diagnosis process of the device is started by the diagnosis start unit according to a state of travel control of the vehicle before the diagnosis process of the device is started.

12 Claims, 11 Drawing Sheets

(56) References Cited

U.S. PATENT DOCUMENTS

| | | | |
|---|---|---|---|
| 2017/0232974 A1 | 8/2017 | Nishida | |
| 2017/0270798 A1 | 9/2017 | Ushiba et al. | |
| 2018/0304858 A1* | 10/2018 | Neff | B60R 25/307 |
| 2019/0025825 A1 | 1/2019 | Takahama | |

FOREIGN PATENT DOCUMENTS

| | | |
|---|---|---|
| JP | 2015210660 A | 11/2015 |
| JP | 2016095831 A | 5/2016 |
| JP | 2017146744 A | 8/2017 |
| JP | 2017165296 A | 9/2017 |
| JP | 6919056 B2 | 8/2021 |
| WO | 2016080452 A1 | 5/2016 |
| WO | 2019167231 A1 | 9/2019 |

OTHER PUBLICATIONS

Japanese Office Action in co-pending, related JP Application No. 2020-503214 dated May 28, 2021.
Decision to Grant for Japanese Patent Application 2020-503214 dated Jul. 9, 2021.

* cited by examiner

F I G. 9
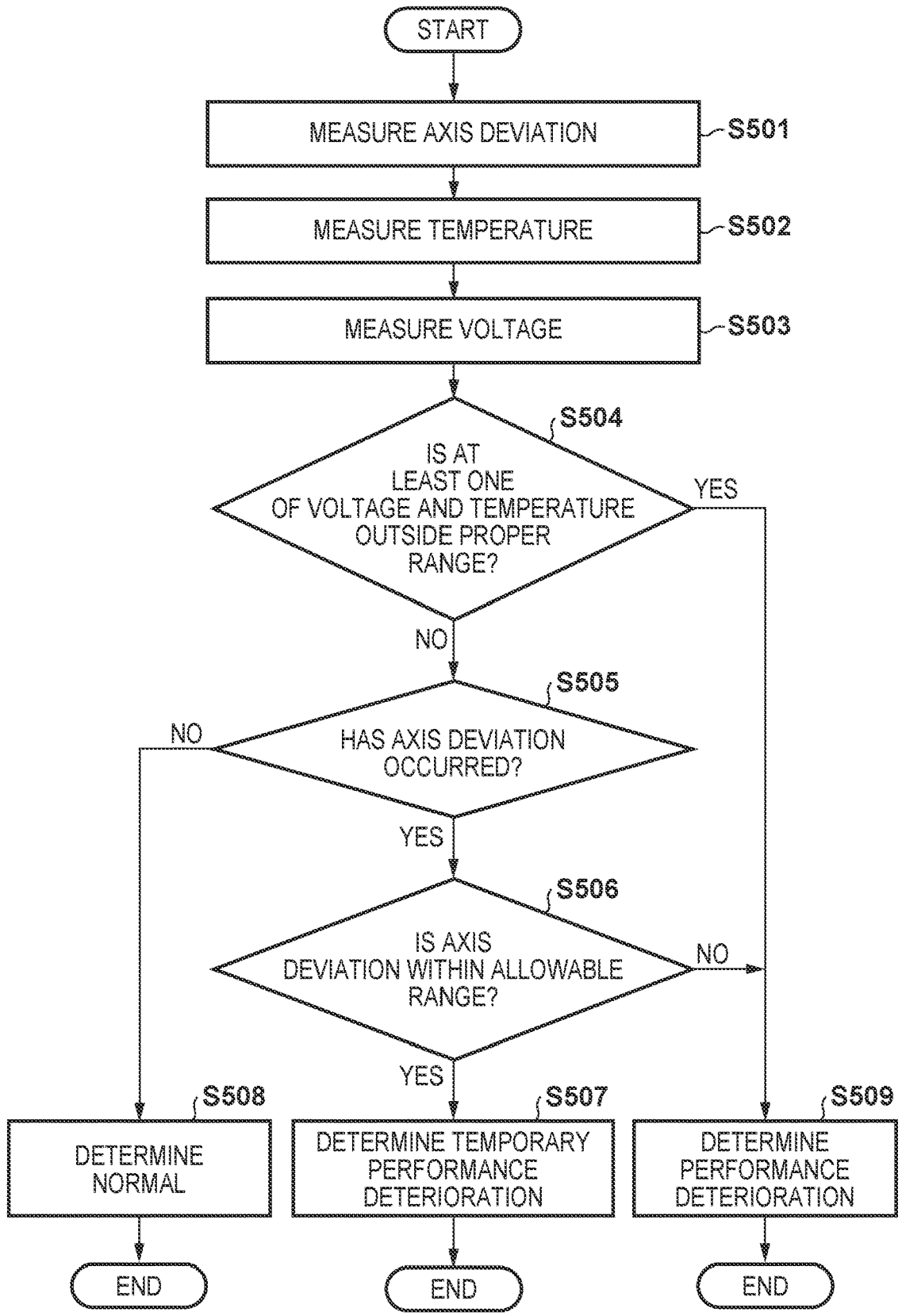

TRAVEL CONTROL DEVICE, TRAVEL CONTROL METHOD, AND COMPUTER-READABLE STORAGE MEDIUM STORING PROGRAM

CROSS-REFERENCE TO RELATED APPLICATION(S)

This application is a continuation of International Patent Application No. PCT/JP2018/007808 filed on Mar. 1, 2018, the entire disclosure of which is incorporated herein by reference.

TECHNICAL FIELD

The present invention relates to a travel control device, a travel control method, and a computer-readable storage medium storing a program that control travel of a self-vehicle.

BACKGROUND ART

In automated driving control that undertakes at least part of driving operation by a driver, a device for recognizing an environment outside a vehicle is indispensable, and such a device is, for example, a sensor. PTL1 describes a sensor whose detection range is from the vehicle to a maximum of 200 m ahead, and describes calculation of a system confidence factor based on a detection rate of the sensor. In addition, PTL1 describes prompting the driver to stop actions other than driving when the system confidence factor falls below a threshold value.

CITATION LIST

Patent Literature

PTL1: Japanese Patent Laid-Open No. 2015-210660

SUMMARY OF INVENTION

Technical Problem

Travel control of a vehicle is required to appropriately respond to a change in an operation state of a device depending on a state of automated driving control. For example, when a function of the device deteriorates, it may be desirable to start transition to manual driving control early depending on the state of automated driving control.

The present invention provides a travel control device, a travel control method, and a computer-readable storage medium storing a program that appropriately restrict a function of travel control of a vehicle according to a state of automated driving control.

Solution to Problem

A travel control device according to the present invention is a travel control device that controls travel of a vehicle, and comprises a device that acquires external information of a vehicle, a travel control unit configured to control travel of the vehicle using an acquisition result by the device, a diagnosis start unit configured to start a diagnosis process of the device, and a restriction unit configured to restrict a function of travel control of the vehicle after the diagnosis process of the device is started by the diagnosis start unit according to a state of travel control of the vehicle before the diagnosis process of the device is started.

A travel control method according to the present invention is a travel control method executed by a travel control device that controls travel of a vehicle, and comprises a travel control step of controlling travel of a vehicle using an acquisition result by a device that acquires external information of the vehicle, a diagnosis start step of starting a diagnosis process of the device, and a restriction step of restricting a function of travel control of the vehicle according to a state of travel control of the vehicle before the diagnosis process of the device is started after the diagnosis process of the device is started in the diagnosis start step.

A computer-readable storage medium according to the present invention is a non-transitory computer-readable storage medium storing a program that causes a computer to: control travel of the vehicle using an acquisition result by a device that acquires external information of the vehicle; start a diagnosis process of the device; and restrict a function of travel control of the vehicle according to a state of travel control of the vehicle before the diagnosis process of the device is started after the diagnosis process of the device is started in the diagnosis start step.

Advantageous Effects of Invention

According to the present invention, it is possible to appropriately restrict the function of travel control of the vehicle according to the state of automated driving control.

Further features of the present invention will become apparent from the following description of exemplary embodiments with reference to the attached drawings.

BRIEF DESCRIPTION OF DRAWINGS

FIG. 9 is a flowchart showing a self-diagnosis process.

DESCRIPTION OF EMBODIMENTS

Figure 1:
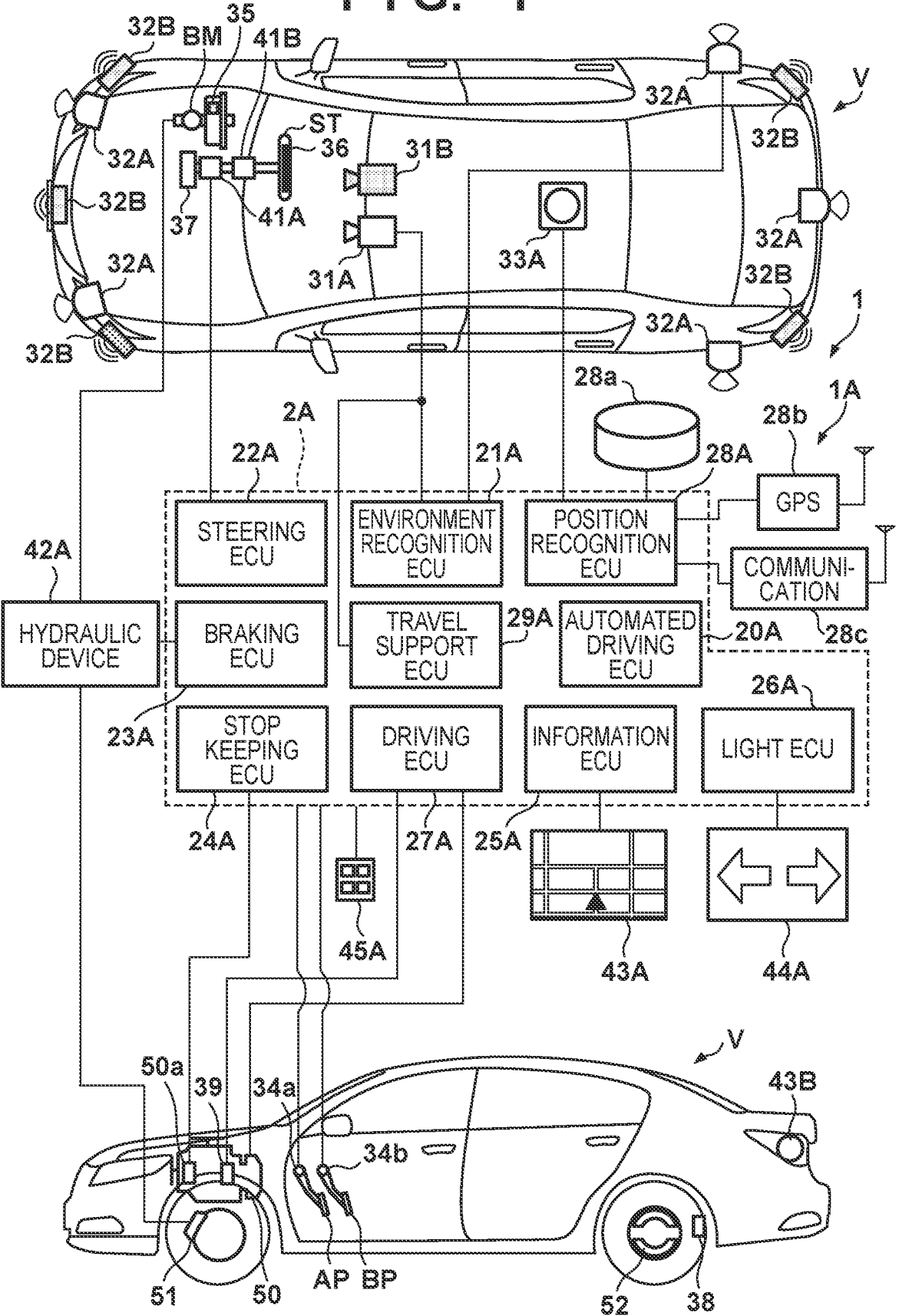
FIG. 1 is a block diagram of a control system for a vehicle.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 2:
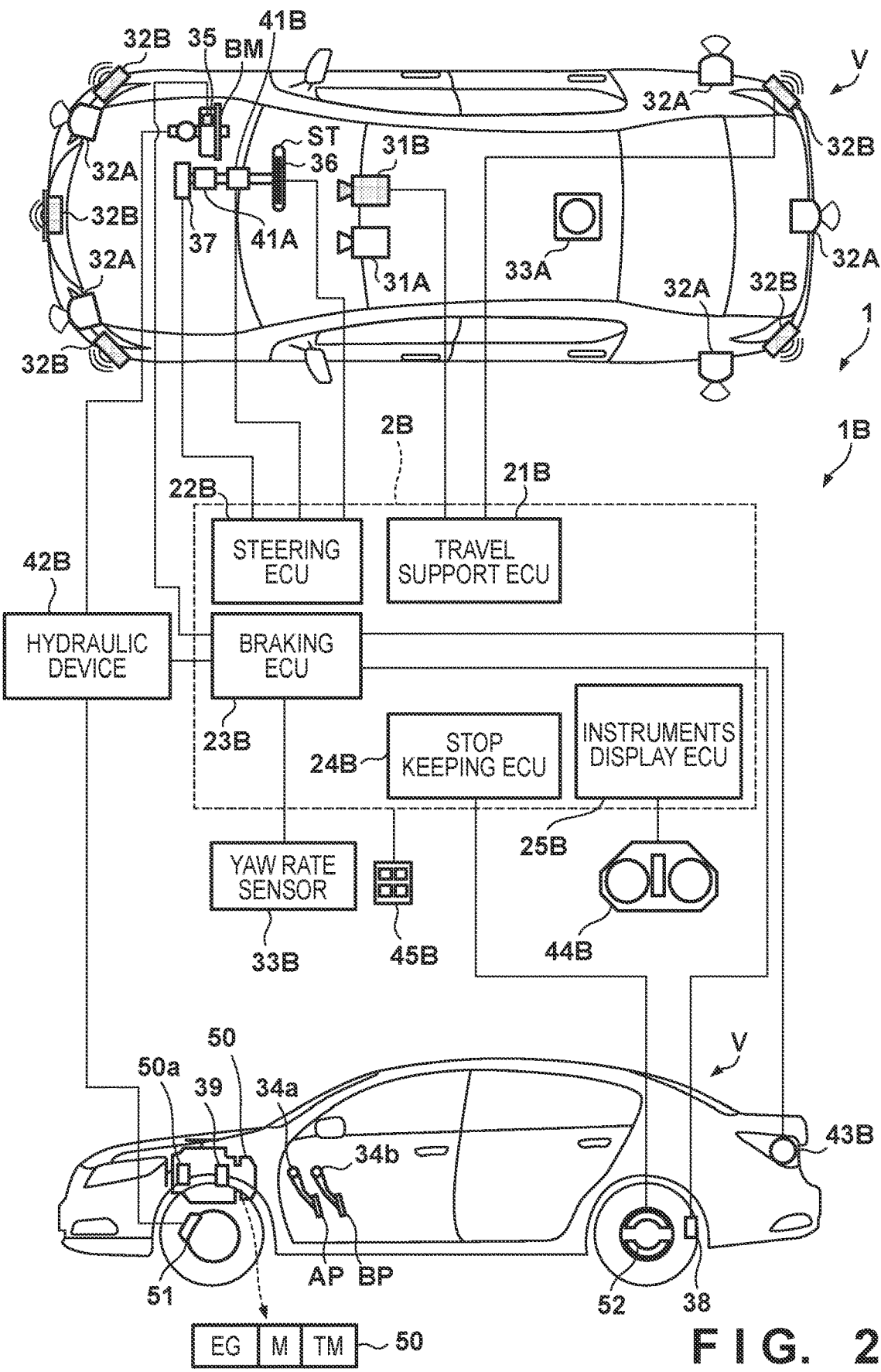
FIG. 2 is a block diagram of the control system for the vehicle.
Figure 3:
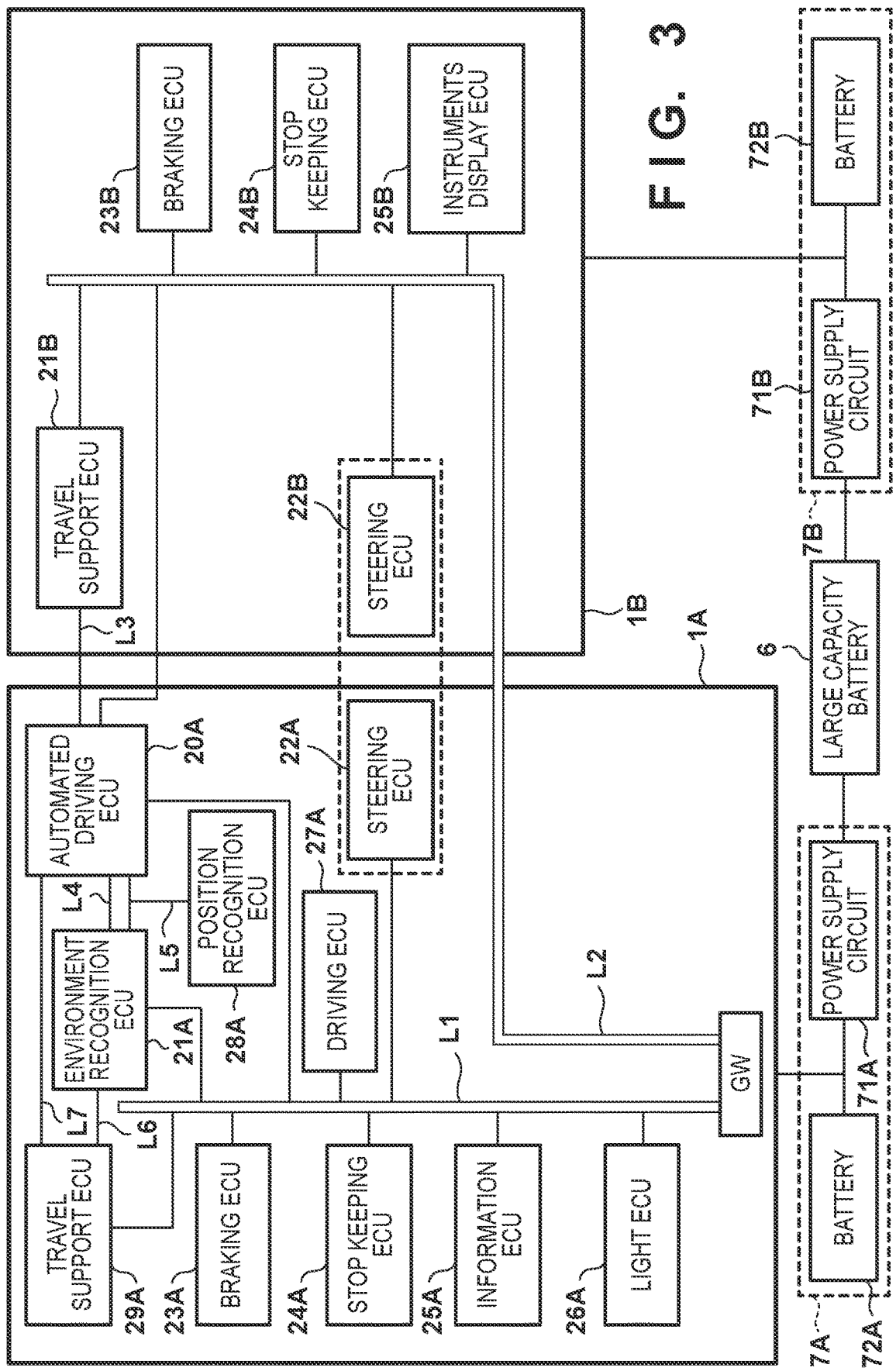
FIG. 3 is a block diagram of the control system for the vehicle.

FIGS. 1-3 are block diagrams of a control system 1 for a vehicle in an embodiment. The control system 1 controls a vehicle V. In FIGS. 1 and 2, the vehicle V is schematically shown in plan views and side views. The vehicle V is a sedan-type four-wheeled passenger vehicle as an example. The control system 1 includes a control device 1A and a control device 1B. FIG. 1 is a block diagram showing the control device 1A, and FIG. 2 is a block diagram showing the control device 1B. FIG. 3 mainly shows a configuration of communication lines between the control device 1A and the control device 1B and a power supply. The configuration of FIG. 3 can be a computer that implements the present invention according to a program.

The control device 1A and the control device 1B are those in which some functions provided by the vehicle V are made multiplexed or redundant. Those can improve reliability of the system. For example, the control device 1A also performs travel support control relating to danger avoidance or the like, in addition to automated driving control and normal operation control in manual driving. The control device 1B mainly administrates travel support control relating to danger avoidance or the like. The travel support may be referred to as driving support. By causing the control device 1A and the control device 1B to perform different control processes while making their functions redundant, the reliability can be improved while the control processes are distributed.

The vehicle V of the embodiment is a parallel hybrid vehicle, and FIG. 2 schematically shows a configuration of a power plant 50 that outputs driving force for rotating drive wheels of the vehicle V. The power plant 50 includes an internal combustion engine EG, a motor M, and an automatic transmission TM. The motor M is usable as a drive source to accelerate the vehicle V and is also usable as a generator during deceleration or the like (regenerative braking).

<Control Device 1A>

The configuration of the control device 1A will be described with reference to FIG. 1. The control device 1A includes an ECU group (a control unit group) 2A. The ECU group 2A includes a plurality of ECUs 20A-29A. Each ECU includes a processor represented by a CPU, a storage device such as a semiconductor memory, an interface with an external device, and the like. The storage device stores a program executed by the processor and data or the like the processor uses for processing. Each ECU may include a plurality of processors, storage devices, interfaces, and the likes. It should be noted that the number of ECUs and functions in charge can be appropriately designed, and functions can be subdivided or integrated as compared with the embodiment. It should be noted that, in FIGS. 1 and 3, names of representative functions of the ECUs 20A-29A are given. For example, the ECU 20A is described as "automated driving ECU."

The ECU 20A performs control relating to automated driving as travel control of the vehicle V. In the automated driving, at least one of driving (such as acceleration of the vehicle V by the power plant 50), steering, and braking of the vehicle V is automatically performed without depending on driving operation of a driver. The embodiment also includes a case where driving, steering, and braking are automatically performed.

The ECU 21A is an environment recognition unit that recognizes a travel environment of the vehicle V based on detection results of detection units 31A and 32A that detect surrounding situations of the vehicle V. The ECU 21A generates target data as surrounding environment information.

In the case of the embodiment, the detection unit 31A is an imaging device hereinafter, may be written as a camera 31A) that detects an object around the vehicle V by imaging. The camera 31A is attached to the front of a roof of the vehicle V on the interior side of a windshield so as to be able to photograph front of the vehicle V. By analyzing an image captured by the camera 31A, contours of a target and lane markings (such as white lines) of a lane on the road can be extracted.

In the case of the embodiment, the detection unit 32A is a lidar (light detection and ranging) (hereinafter, may be written as a lidar 32A) that detects an object around the vehicle V by light, and detects a target around the vehicle V and measures a distance to the target. In the case of the embodiment, five lidars 32A are provided, that is, one at each corner of the front of the vehicle V, one at the center of the rear, and one on each side of the rear. The number and arrangement of the lidars 32A can be appropriately selected.

The ECU 29A is a travel support unit that performs control relating to travel support (in other words, driving support) as travel control of the vehicle V based on a detection result of the detection unit 31A.

The ECU 22A is a steering control unit that controls an electric power steering device 41A. The electric power steering device 41A includes a mechanism that steers front wheels in response to the driver's driving operation (steering operation) on a steering wheel ST. The electric power steering device 41A includes a motor that provides driving force for assisting the steering operation or automatically steering the front wheels, a sensor that detects a rotation amount of the motor, a torque sensor that detects a steering torque which the driver bears, and the like.

The ECU 23A is a braking control unit that controls a hydraulic device 42A. Braking operation by the driver on a brake pedal BP is converted into hydraulic pressure in a brake master cylinder BM and transmitted to the hydraulic device 42A. The hydraulic device 42A is an actuator capable of controlling hydraulic pressure of operation oil supplied to brake devices (for example, disc brake devices) 51 provided on the four respective wheels based on the hydraulic pressure transmitted from the brake master cylinder BM. The ECU 23A controls drive of a solenoid valve or the like included in the hydraulic device 42A. In the case of the embodiment, the ECU 23A and the hydraulic device 42A constitute an electric servo brake, and the ECU 23A controls, for example, distribution between braking force by the four brake devices 51 and braking force by the regenerative braking of the motor M.

The ECU 24A is a control unit for keeping stopped that controls an electric parking lock device 50a provided in the automatic transmission TM. The electric parking lock device 50a includes a mechanism that locks an internal mechanism of the automatic transmission TM mainly when a P range (parking range) is selected. The ECU 24A can control locking and unlocking by the electric parking lock device 50a.

The ECU 25A is an inside-vehicle notification control unit that controls an information output device 43A that notifies information to the inside of the vehicle. The information output device 43A includes a display device such as a head-up display and a voice output device. Furthermore, it may include a vibration device. The ECU 25A causes the information output device 43A to output, for example, various types of information such as vehicle speed and outside temperature, and information such as route guidance.

The ECU 26A is an outside-vehicle notification control unit that controls an information output device 44A that notifies information to the outside of the vehicle. In the case of the embodiment, the information output device 44A is a direction indicator (hazard lamp), and the ECU 26A controls blinking of the information output device 44A as the direction indicator to notify a traveling direction of the vehicle V to the outside of the vehicle, controls blinking of the information output device 44A as the hazard lamp, and thereby can increase the level of attention that those outside of the vehicle pay to the vehicle V.

The ECU 27A is a drive control unit that controls the power plant 50. In the embodiment, one ECU 27A is assigned to the power plant 50, but one ECU may be assigned to each of the internal combustion engine EG, the motor M, and the automatic transmission TM. For example, the ECU 27A controls output of the internal combustion engine EG or the motor M or switches gear ratios of the automatic transmission TM in response to the driver's driving operation, vehicle speed, or the like detected by an operation detection sensor 34a provided on an accelerator pedal AP or an operation detection sensor 34b provided on a brake pedal BP. It should be noted that the automatic transmission TM is provided with a rotation speed sensor 39 that detects the number of rotations of an output shaft of the automatic transmission TM as a sensor that detects a traveling state of the vehicle V. The vehicle speed of the vehicle V can be calculated from a detection result of the rotation speed sensor 39.

The ECU 28A is a position recognition unit that recognizes the current position and traveling course of the vehicle V. The ECU 28A controls a gyro sensor 33A, a GPS sensor 28b, and a communication device 28c, and performs information processing on detection results or communication results. The gyro sensor 33A detects rotational movement of the vehicle V. It is possible to determine the traveling course of the vehicle V by a detection result or the like of the gyro sensor 33A. The GPS sensor 28b detects the current position of the vehicle V. The communication device 28c wirelessly communicates with a server that provides map information and road traffic information and acquires the information. A database 28a can store map information with high accuracy, and the ECU 28A can identify the position of the vehicle V with higher accuracy on a lane based on the map information and the like. The communication device 28c is also used in vehicle-to-vehicle communication and road-to-vehicle communication, and can acquire, for example, information on other vehicles.

An input device 45A is disposed inside the vehicle so that the driver can operate, and receives an input of instructions and information from the driver, <Control Device 1B>

The configuration of the control device 1B will be described with reference to FIG. 2. The control device 1B includes an ECU group (a control unit group) 2B. The ECU group 2B includes a plurality of ECUs 21B-25B. Each ECU includes a processor represented by a CPU or a GPU, a storage device such as a semiconductor memory, an interface with an external device, and the like. The storage device stores a program executed by the processor and data or the like the processor uses for processing. Each ECU may include a plurality of processors, storage devices, interfaces, and the likes. It should be noted that the number of ECUs and functions in charge can be appropriately designed, and functions can be subdivided or integrated as compared with the embodiment. It should be noted that, in FIGS. 2 and 3, names of representative functions of the ECUs 21B-25B are given as in the ECU group 2A.

The ECU 21B is an environment recognition unit that recognizes the travel environment of the vehicle V based on detection results of detection units 31B and 32B that detect surrounding situations of the vehicle V, and is also a travel support unit that performs control relating to travel support (in other words, driving support) as travel control of the vehicle V. The ECU 21B generates target data as surrounding environment information.

It should be noted that, in the embodiment, the ECU 21B includes the environment recognition function and the travel support function, but an ECU can be provided for each function like the ECU 21A and the ECU 29A of the control device 1A. Conversely, in the control device 1A, one ECU may provide the functions of the ECU 21A and the ECU 29A like the ECU 21B.

In the case of the embodiment, the detection unit 31B is an imaging device (hereinafter, may be written as a camera 31B) that detects an object around the vehicle V by imaging. The camera 31B is attached to the front of the roof of the vehicle V on the interior side of the windshield so as to be able to photograph front of the vehicle V. By analyzing an image captured by the camera 31B, contours of the target and lane markings (such as white lines) of a lane on the road can be extracted. In the case of the embodiment, the detection unit 32B is a millimeter wave radar (hereinafter, may be written as a radar 32B) that detects an object around the vehicle V by radio wave, detects a target around the vehicle V, and measures a distance to the target. In the case of the embodiment, five radars 32B are provided, that is, one at the center of the front of the vehicle V, one at each corner of the front, and one at each corner of the rear. The number and arrangement of the radars 32B can be appropriately selected.

The ECU 22B is a steering control unit that controls an electric power steering device 41B. The electric power steering device 41B includes a mechanism that steers the front wheels in response to the driver's driving operation (steering operation) on the steering wheel ST. The electric power steering device 41B includes a motor that provides driving force for assisting the steering operation or automatically steering the front wheels, a sensor that detects the rotation amount of the motor, a torque sensor that detects the steering torque which the driver bears, and the like. The ECU 22B is electrically connected to a steering angle sensor 37 via a later-described communication line L2, and can control the electric power steering device 41B based on a detection result of the steering angle sensor 37. The ECU 22B can acquire a detection result of a sensor 36 that detects whether the driver is holding the steering wheel ST, and monitor the holding state of the driver.

The ECU 23B is a braking control unit that controls a hydraulic device 42B. Braking operation by the driver on the brake pedal BP is converted into hydraulic pressure in the brake master cylinder BM and transmitted to the hydraulic device 42B. The hydraulic device 42B is an actuator capable of controlling hydraulic pressure of the operation oil supplied to the brake devices 51 of the respective wheels based on the hydraulic pressure transmitted from the brake master cylinder BM. The ECU 23B controls drive of a solenoid valve or the like included in the hydraulic device 42B.

In the case of the embodiment, the ECU 23B and the hydraulic device 42B are electrically connected to wheel speed sensors 38 provided on the four respective wheels, a yaw rate sensor 33B, and a pressure sensor 35 that detects the pressure in the brake master cylinder BM, and implement an ABS function, traction control, and an attitude control function of the vehicle V based on detection results of the sensors. For example, the ECU 23B adjusts braking force of each wheel based on a detection result of the wheel speed sensor 38 provided for each of the four wheels, and suppresses sliding of each wheel. It also adjusts braking force of each wheel based on rotational angular velocity of the vehicle V around a vertical axis detected by the yaw rate sensor 33B to suppress a sudden attitude change of the vehicle V.

The ECU 23B also functions as an outside-vehicle notification control unit that controls an information output device 43B that notifies information to the outside of the vehicle. In the case of the embodiment, the information output device 43B is a brake lamp, and the ECU 23B can turn on the brake lamp at the time of braking or the like. This can increase the level of attention that the driver of a following vehicle pays to the vehicle V.

The ECU 24B is a control unit for keeping stopped that controls an electric parking brake device (for example, a drum brake) 52 provided for rear wheels. The electric parking brake device 52 includes a mechanism that locks the rear wheels. The ECU 24B can control locking and unlocking of the rear wheels by the electric parking brake device 52.

The ECU 25B is an inside-vehicle notification control unit that controls an information output device 44B that notifies information to the inside of the vehicle. In the case of the embodiment, the information output device 44B includes a display device arranged on an instrument panel. The ECU 25B can cause the information output device 44B to output various types of information such as vehicle speed and fuel consumption.

An input device 45B is disposed inside the vehicle so that the driver can operate, and receives an input of instructions and information from the driver.

<Communication Line>

An example of communication lines of the control system 1 that communicatively connect ECUs will be described with reference to FIG. 3. The control system 1 includes wired communication lines L1-L7. The communication line L1 is connected to the ECUs 20A-27A and 29A of the control device 1A. It should be noted that the ECU 28A may be also connected to the communication line L1.

The communication line L2 is connected to the ECUs 21B-25B of the control device 1B. The ECU 20A of the control device 1A is also connected to the communication line L2. The communication line L3 connects the ECU 20A and the ECU 21B, and the communication line 4 connects the ECU 20A and the ECU 21A. The communication line L5 connects the ECU 20A, the ECU 21A, and the ECU 28A. The communication line L6 connects the ECU 29A and the ECU 21A. The communication line L7 connects the ECU 29A and the ECU 20A.

Protocols of the communication lines L1-L7 may be the same or different, and may be different according to a communication environment such as communication speed, communication traffic, or durability. For example, protocols of the communication lines L3 and L4 may be Ethernet (R) in terms of communication speed. For example, protocols of the communication lines L1, L2, and L5-L7 may be CAN.

The control device 1A includes a gateway GW. The gateway GW functions as a relay for the communication line L1 and the communication line L2. Therefore, for example, the ECU 21B can output a control command to the ECU 27A via the communication line L2, the gateway GW, and the communication line L1.

<Power Supply>

The power supply of the control system 1 will be described with reference to FIG. 3. The control system 1 includes a large capacity battery 6, a power supply 7A, and a power supply 7B. The large capacity battery 6 is a battery for driving the motor M and also is a battery charged by the motor M.

The power supply 7A is a power supply that supplies power to the control device 1A, and includes a power supply circuit 71A and a battery 72A. The power supply circuit 71A is a circuit that supplies power of the large capacity battery 6 to the control device 1A, and, for example, drops an output voltage of the large capacity battery 6 (for example, 190 V) to a reference voltage (for example, 12 V). The battery 72A is, for example, a lead battery of 12 V. Providing the battery 72A allows power to be supplied to the control device 1A even if power supply from the large capacity battery 6 or the power supply circuit 71A is cut off or reduced.

The power supply 7B is a power supply that supplies power to the control device 1B, and includes a power supply circuit 71B and a battery 72B. The power supply circuit 71B is a circuit similar to the power supply circuit 71A, and is a circuit that supplies power of the large capacity battery 6 to the control device 1B. The battery 72B is a battery similar to the battery 724, and is, for example, a lead battery of 12 V. Providing the battery 72B allows power to be supplied to the control device 1B even if power supply from the large capacity battery 6 or the power supply circuit 71B is cut off or reduced.

<Redundancy>

Commonality of functions of the control device 1A and the control device 1B will be described. Making the same functions redundant can improve reliability of the control system 1. Some functions that are made redundant do not duplicate exactly the same functions but provide different functions. This suppresses cost increase due to making functions redundant.

[Actuator System]

Steering

The control device 1A includes the electric power steering device 41A and the ECU 22A for controlling it. The control device 1B also includes the electric power steering device 41B and the ECU 22B for controlling it.

Braking

The control device 1A includes the hydraulic device 42A and the ECU 23A for controlling it. The control device 1B includes the hydraulic device 42B and the ECU 23B for controlling it. Both of them can be used for braking the vehicle V. On the other hand, the braking mechanism of the control device 1A has a main function of distributing the braking force by the brake devices 51 and the braking force by the regenerative braking of the motor M, whereas the braking mechanism of the control device 1B has a main function of the attitude control and the like. Both are common in terms of braking but provide different functions from each other.

Stop Keeping

The control device 1A includes the electric parking lock device 50a and the ECU 24A for controlling it. The control device 1B includes the electric parking brake device 52 and the ECU 24B for controlling it. Both of them can be used for keeping the vehicle V stopped. On the other hand, the electric parking lock device 50a is a device that functions when the P range of the automatic transmission TM is selected, whereas the electric parking brake device 52 is for locking the rear wheels. Both are common in terms of keeping the vehicle V stopped but provide different functions from each other.

Inside-Vehicle Notification

The control device 1A includes the information output device 43A and the ECU 25A for controlling it. The control device 1B includes the information output device 44B and the ECU 25B for controlling it. Both of them can be used for notifying the driver of information. On the other hand, the information output device 43A is, for example, a head-up display, whereas the information output device 44B is a display device such as an instrument. Both are common in terms of inside-vehicle notification but can adopt different display devices from each other Outside-Vehicle Notification The control device 1A includes the information output device 44A and the ECU 26A for controlling it. The control device 1B includes the information output device 43B and the ECU 23B for controlling it. Both of them can be used for notifying information to the outside of the vehicle. On the other hand, the information output device 44A is a direction indicator (hazard lamp), whereas the information output device 43B is a brake lamp. Both are common in terms of outside-vehicle notification but provide different functions from each other.

Difference

The control device 1A includes the ECU 27A that controls the power plant 50, whereas the control device 1B does not include its own ECU that controls the power plant 50. In the case of the embodiment, both of the control devices 1A and 1B are capable of steering, braking, and stop keeping individually, and can decelerate and keep the stopped state while preventing deviation from the lane even when either the control device 1A or the control device 1B deteriorates in performance or has power supply or communication cut off. As described above, the ECU 21B can output a control command to the ECU 27A via the communication line L2, the gateway GW, and the communication line L1, and the ECU 21B can also control the power plant 50. Since the control device 1B does not include its own ECU that controls the power plant 50, cost increase can be prevented, but the control device 1B may include its own ECU.

[Sensor System]

Surrounding Situation Detection

The control device 1A includes the detection units 31A and 32A. The control device 1B includes the detection units 31B and 32B. Both of them can be used for recognizing the travel environment of the vehicle V. On the other hand, the detection unit 32A is a lidar, and the detection unit 32B is a radar. The lidar is generally advantageous for shape detection, The radar is generally more advantageous in cost than the lidar. Using the sensors having different characteristics allows recognition performance of a target to be improved and cost to be reduced. The detection units 31A and 31B are both cameras, but cameras having different characteristics may be used. For example, one may be a camera having a higher resolution than the other. Angles of view may be different from each other.

When the control device 1A is compared with the control device 1B, the detection units 31A and 32A may have different detection characteristics from the detection units 31B and 32B. In the case of the embodiment, the detection unit 32A is the lidar, and generally has higher detection performance for an edge of the target than the radar (detection unit 32B). The radar generally has better relative speed detection accuracy and weatherability than the lidar.

If the camera 31A has a higher resolution than the camera 31B, the detection units 31A and 32A have higher detection performance than the detection units 31B and 32B. By combining a plurality of such sensors having different detection characteristics and costs, cost benefits may be obtained when considering the entire system. Combining sensors having different detection characteristics can also reduce detection omissions and erroneous detections compared with a case where the same sensors are made redundant.

Vehicle Speed

The control device 1A includes the rotation speed sensor 39. The control device 1B includes the wheel speed sensor 38. Both of them can be used for detecting vehicle speed. On the other hand, the rotation speed sensor 39 detects the rotation speed of the output shaft of the automatic transmission TM, whereas the wheel speed sensor 38 detects the rotation speed of the wheel. Both are common in terms of being able to detect vehicle speed but are sensors whose detection targets are different from each other.

Yaw Rate

The control device 1A includes the gyro sensor 33A. The control device 1B includes the yaw rate sensor 33B. Both of them can be used for detecting angular velocity of the vehicle V around the vertical axis. On the other hand, the gyro sensor 33A is used for determining the traveling course of the vehicle V, whereas the yaw rate sensor 33B is used for the attitude control and the like of the vehicle V. Both are common in terms of being able to detect angular velocity of the vehicle V but are sensors whose use purposes are different from each other.

Steering Angle and Steering Torque

The control device 1A includes the sensor that detects the rotation amount of the motor of the electric power steering device 41A. The control device 1B includes the steering angle sensor 37. Both of them can be used for detecting the steering angle of the front wheels. In the control device 1A, cost increase can be suppressed by using the sensor that detects the rotation amount of the motor of the electric power steering device 41A without providing the steering angle sensor 37. However, the steering angle sensor 37 may be additionally provided also for the control device 1A.

Both of the electric power steering devices 41A and 41B include the torque sensor, so both of the control devices 1A and 1B can recognize the steering torque.

Braking Operation Amount

The control device 1A includes the operation detection sensor 34b. The control device 1B includes the pressure sensor 35. Both of them can be used for detecting a braking operation amount by the driver. On the other hand, the operation detection sensor 34b is used for controlling distribution of the braking force by the four brake devices 51 and the braking force by the regenerative braking of the motor M, whereas the pressure sensor 35 is used for the attitude control and the like. Both are common in terms of detecting the braking operation amount but are sensors whose use purposes are different from each other.

[Power Supply]

The control device 1A is supplied power from the power supply 7A, whereas the control device 1B is supplied power from the power supply 7B. Even if power supply of either the power supply 7A or the power supply 7B is cut off or reduced, either the control device 1A or the control device 1B is supplied with power, so the power supply is more reliably secured, and the reliability of the control system 1 can be improved. When the power supply of the power supply 7A is cut off or reduced, communication between ECUs via the gateway GW provided in the control device 1A becomes difficult. In the control device 1B, however, the ECU 21B can communicate with the ECUs 22B-24B and 44B via the communication line L2.

[Redundancy in Control Device 1A]

The control device 1A includes the ECU 20A that performs automated driving control and the ECU 29A that performs travel support control, and so includes two control units that perform travel control.

<Example of Control Function>

Control functions that can be performed by the control device 1A or 1B include travel related functions relating to driving, braking, and steering control of the vehicle V and notification functions relating to notification of information to the driver.

Examples of the travel related functions can include lane keeping control, lane departure suppression control (outside-road departure suppression control), lane change control, preceding vehicle following control, collision mitigation brake control, and erroneous start suppression control. Examples of the notification functions can include adjacent vehicle notification control and preceding vehicle start notification control.

The lane keeping control is one of vehicle position controls with respect to the lane, and is a control that causes the vehicle to automatically travel on a travel track set in the lane (without depending on the driver's driving operation). The lane departure suppression control is one of vehicle position controls with respect to the lane, and is a control that detects white lines or a median strip and automatically steers the vehicle so as not to cross the lines. The lane departure suppression control and the lane keeping control are different in functions in this way.

The lane change control is a control that automatically moves the vehicle from a lane in which the vehicle is traveling to an adjacent lane. The preceding vehicle following control is a control that automatically follows another vehicle traveling in front of a self-vehicle. The collision mitigation brake control is a control that automatically brakes to assist collision avoidance when a possibility of collision with an obstacle in front of the vehicle increases. The erroneous start suppression control is a control that limits acceleration of the vehicle when acceleration operation by the driver is a predetermined amount or more while the vehicle is stopped, and prevents a sudden start.

The adjacent vehicle notification control is a control that notifies the driver of the presence of another vehicle traveling in an adjacent lane adjacent to the traveling lane of the self-vehicle, and, for example, notifies the presence of another vehicle traveling in a lateral direction or rearward of the self-vehicle. The preceding vehicle start notification control is a control that notifies that another vehicle in front has started when the self-vehicle and the other vehicle in front of it are stopped. The notification can be performed by the above-described inside-vehicle notification devices (information output device 43A and information output device 44B).

The ECU 20A, the ECU 29A, and the ECU 21B can share and perform those control functions. That which control function is assigned to which ECU can be appropriately selected.

Figure 4:
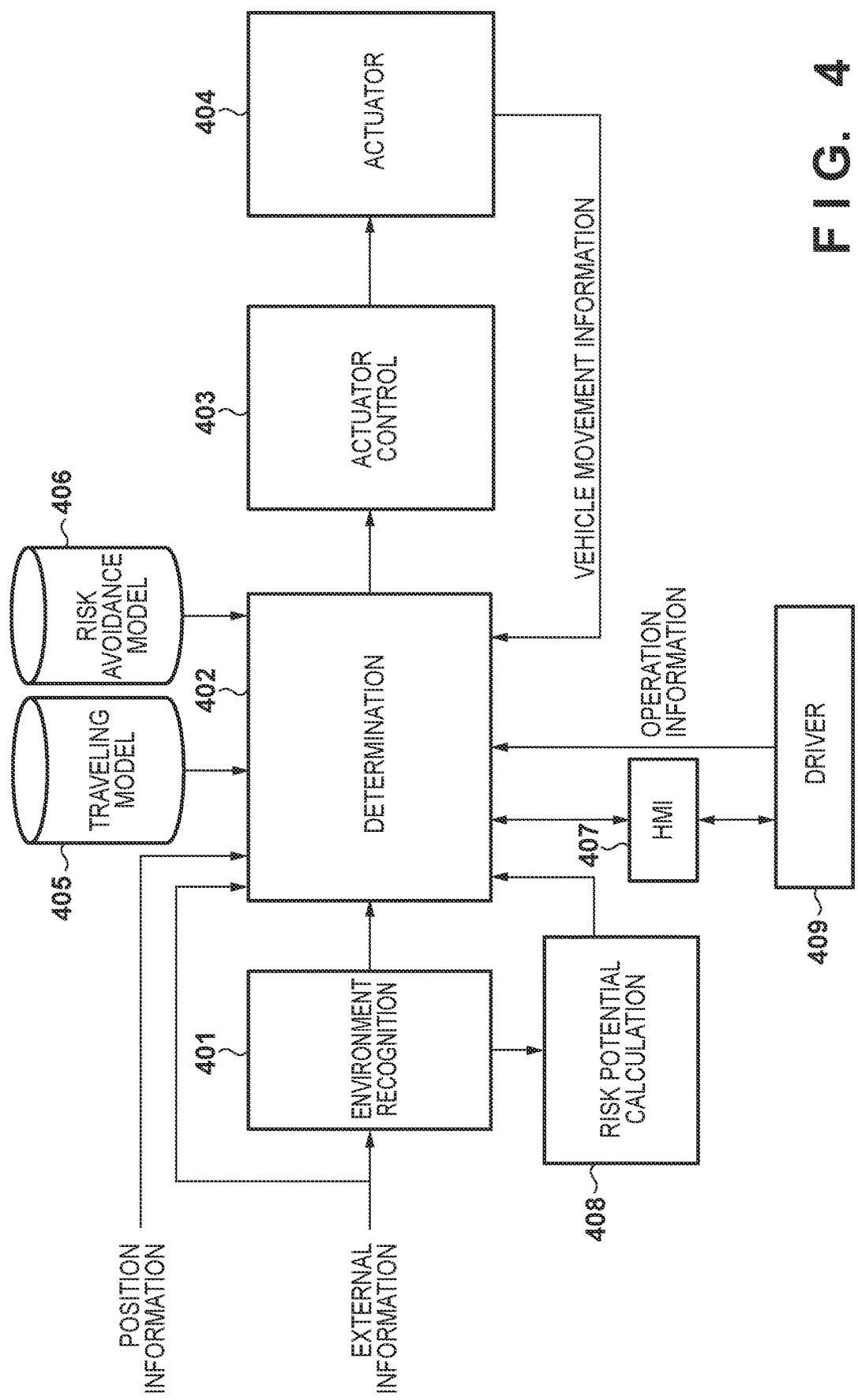
FIG. 4 is a diagram showing a block configuration up to control of an actuator.

FIG. 4 is a diagram showing a block configuration from acquisition of external information to control of an actuator in the vehicle V. A block 401 of FIG. 4 is implemented by, for example, the ECU 21A of FIG. 1. The block 401 acquires external information of the vehicle V. Here, the external information is image information and detection information acquired by, for example, the detection units 31A, 31B, 32A, and 32B (cameras, radar, and lidar) mounted on the vehicle V. Alternatively, the external information may be acquired by vehicle-to-vehicle communication or road-to-vehicle communication. The block 401 recognizes obstacles, signs, and the like such as guardrails and separating bands, and outputs the recognition results to a block 402 and a block 408. The block 408 is implemented by, for example, the ECU 29A of FIG. 1, calculates a risk potential in determining an optimum route based on information such as obstacles, pedestrians, and other vehicles recognized by the block 401, and outputs the calculation results to the block 402.

The block 402 is implemented by, for example, the ECU 29A or 20A of FIG. 1. The block 402 determines the optimum route based on the recognition results of the external information, vehicle movement information such as speed and acceleration, and operation information (such as a steering amount and an acceleration amount) from a driver 409. At the time, a traveling model 405 and a risk avoidance model 406 are considered. The traveling model 405 and the risk avoidance model 406 are traveling models generated as a result of learning based on, for example, probe data collected in a server in advance through test traveling by an expert driver. In particular, the traveling model 405 is a model generated for each scene such as a curve and an intersection, and the risk avoidance model 406 is a model, for example, for predicting sudden braking of a preceding vehicle or predicting movement of a moving object such as a pedestrian. The traveling model and the risk avoidance model generated by the server are implemented in the vehicle V as the traveling model 405 and the risk avoidance model 406. When the automated driving support system is configured in the vehicle V, the block 402 determines a support amount based on the operation information from the driver 409 and a target value, and transmits the support amount to a block 403.

The block 403 is implemented by, for example, the ECU 22A, 23A, 24A, or 27A of FIG. 1. For example, a control amount of the actuator is determined based on the optimal route and the support amount determined by the block 402. An actuator 404 includes systems of steering, braking, stop keeping, inside-vehicle notification, and outside-vehicle notification. A block 407 is an HMI (Human Machine Interface), an interface with the driver 409, and is implemented as the input device 45A or 45B. The block 407 receives, for example, notification of switching between an automated driving mode and a driver driving mode, and a comment from the driver when probe data is transmitted in a case where the vehicle V is driven by the above-described expert driver.

In the embodiment, when a symptom of performance deterioration of a device that recognizes the environment outside the vehicle V is detected, function restriction of the automated driving control is executed according to a state of the automated driving control currently being performed. As will be described later, as the function restriction of the automated driving control, for example, switching to the manual driving control or alternative control is performed.

Here, each state of the automated driving control in the embodiment will be described. Table 1 is a table for describing definition of each state of the automated driving control in the embodiment. It should be noted that, although not shown in Table 1, a state 0 is manual driving control by the driver.

TABLE 1

| Automated driving control state | Movement (transition) condition to each state | Driving subject | Obligation for driver to monitor surrounding environment | Necessity for driver to hold steering wheel |
|---|---|---|---|---|
| State 3 | Congestion scene on high-speed main line | Vehicle system | Unnecessary | Unnecessary |
| State 2-2 | No-congestion scene on high-speed main line | Driver | Necessary | Unnecessary |
| State 2-1 | Merge/branch path scene to/from high-speed main line | Driver | Necessary | Necessary |
| State 1 | Only longitudinal control/lateral control | Driver | Necessary | Necessary |

In the embodiment, a state 3 is defined as an automated driving control state that is performed in a congestion scene on a high-speed main line. In the state 3, the vehicle is driven by the vehicle system of FIGS. 1-4, and both driver's surrounding environment monitoring obligation and driver's steering wheel holding are not necessary. However, in order to prepare for warning notification when the vehicle system fails, the driver needs be obliged to monitor the vehicle system. On the other hand, a state 2-2 is defined as an automated driving control state that is performed on a high-speed main line that is not congested. In the state 2-2, the vehicle is driven by the driver, and the driver's surrounding environment monitoring obligation is necessary. In the state 2-2, however, the driver does not need to hold the steering wheel. A state 2-1 is defined as an automated driving control state performed in a scene of a merge/branch path to/from the high-speed main line, in the state 2-1, the vehicle is driven by the driver, and both driver's obligation to monitor the surroundings and driver's steering wheel holding are necessary.

A state 1 is defined as a case where only longitudinal control or lateral control of the vehicle is performed. Here, the longitudinal control is, for example, ACC (Adaptive Cruise Control), and the lateral control is, for example, LKAS (Lane Keeping Assistant System). In the state 1, the vehicle is driven by the driver, and there is both the need for the driver's obligation to monitor the surroundings and for the driver to hold the steering wheel. Hereinafter, operation in the embodiment will be described using each state described above.

Figure 5A:
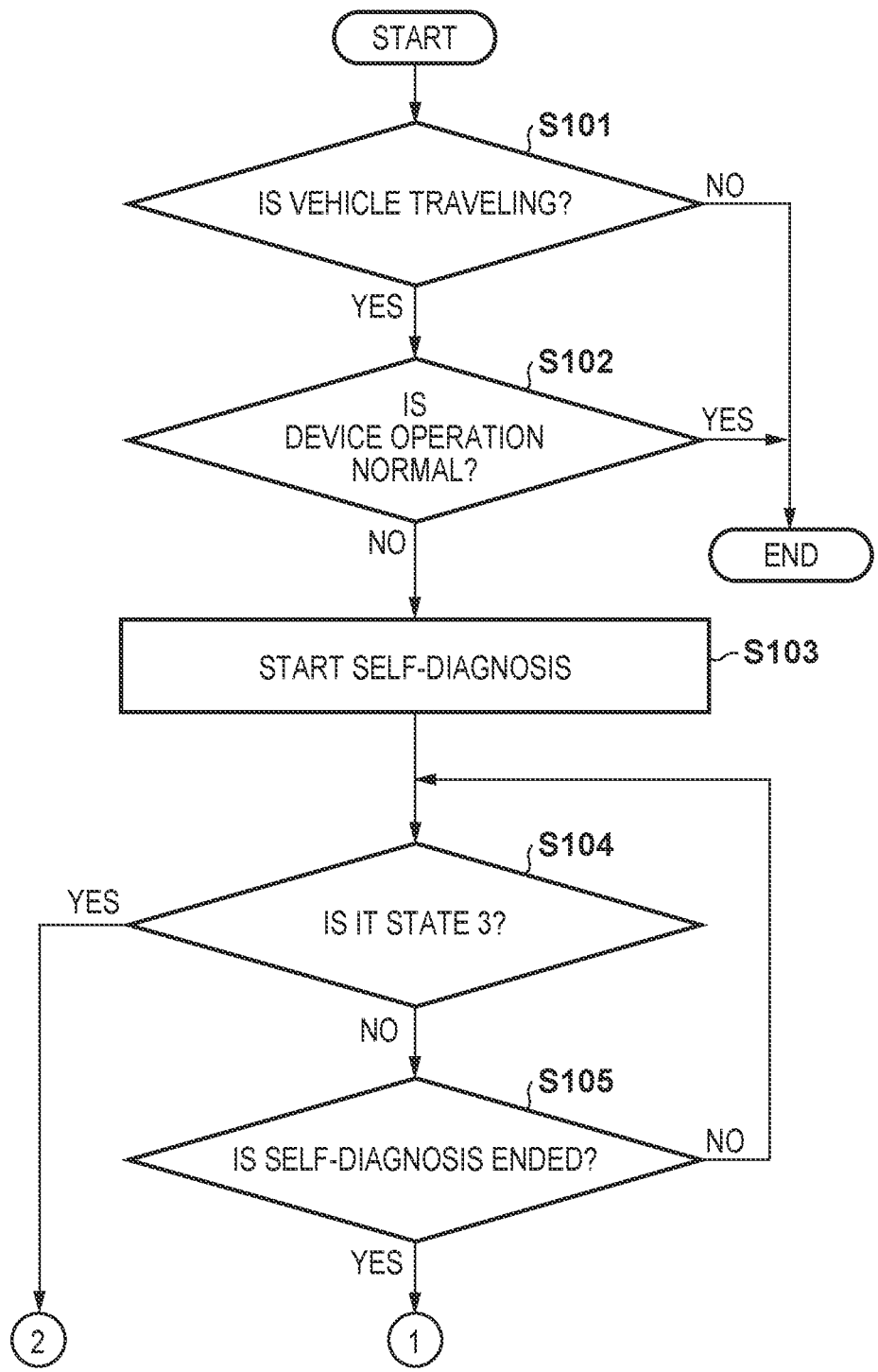
FIG. 5A is a flowchart showing a process when performance of a device deteriorates.
Figure 5B:
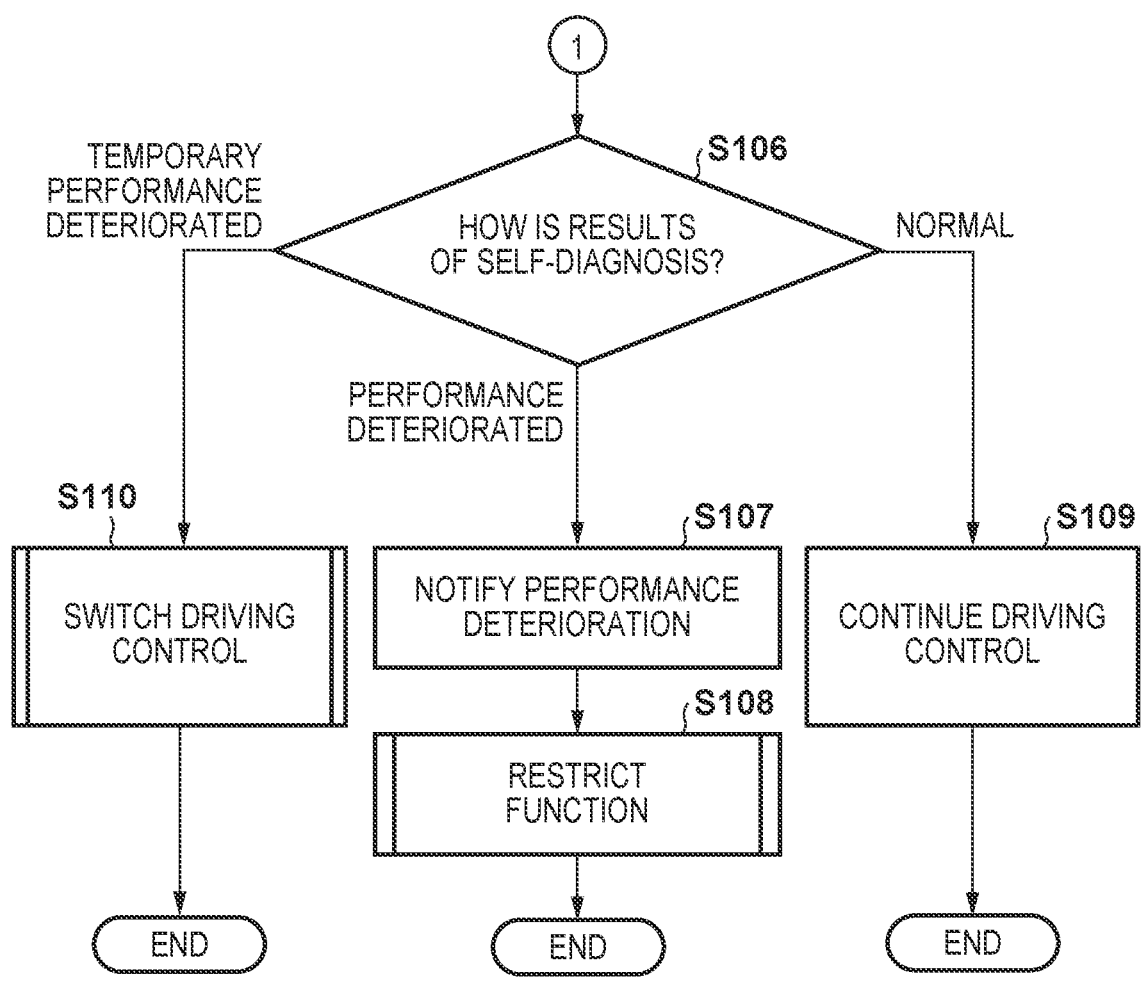
FIG. 5B is a flowchart showing the process when performance of the device deteriorates.

FIGS. 5A and 5B are flowcharts showing a process when performance of the device deteriorates in the embodiment.

In S101, the block 402 determines whether the vehicle is traveling. When it is determined that the vehicle is traveling, the process proceeds to S102, whereas when it is determined that the vehicle is not traveling, the process of FIGS. 5A and 5B ends.

In S102, the block 402 determines whether the device that recognizes the environment outside the vehicle V is in a normal operation state. When it is determined to be in the normal operation state, the process of FIGS. 5A and 5B ends. On the other hand, when it is determined not to be in the normal operation state, the process proceeds to S103. Here, being not in the normal operation state represents that there is a symptom of performance deterioration of the device as a result of monitoring the device state. Hereinafter, a process of state monitoring of the device that recognizes the environment outside the vehicle V will be described.

Figure 6:
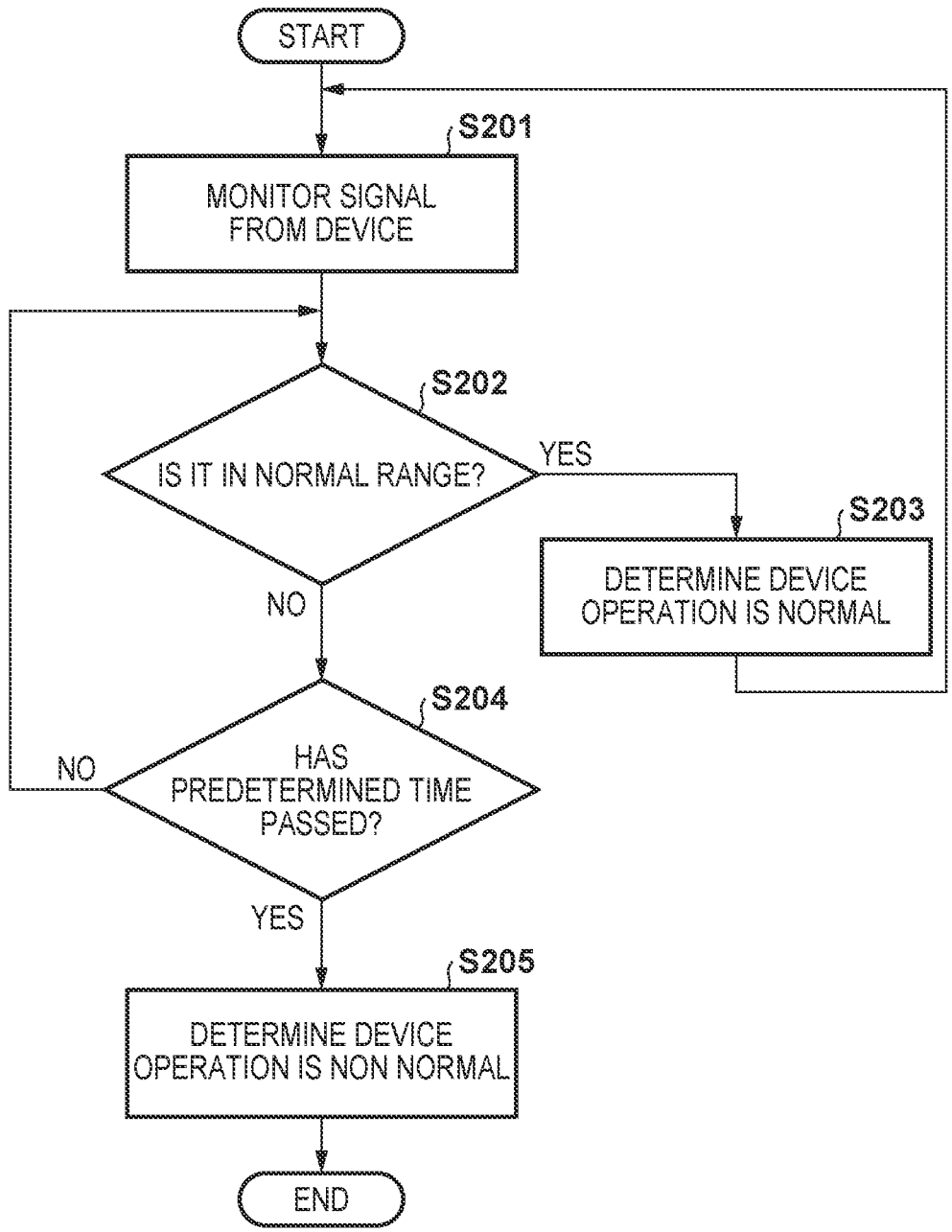
FIG. 6 is a flowchart showing a process of state monitoring of the device.

FIG. 6 is a flowchart showing the process of monitoring the state of the device that recognizes the environment outside the vehicle V. The process of FIG. 6 is performed in parallel with the process of FIGS. 5A and 5B. In the embodiment, the device that recognizes the environment outside the vehicle V is, for example, a camera, a millimeter wave radar, or a lidar, and corresponds to the camera 31A or the camera 31B, the radar 32B, or the lidar 32A. In S201, the block 402 monitors a signal from the device, and, in S202, determines whether a signal value is in a normal range. If it is determined to be in the normal range, the block 402 determines, in S203, that operation of the device is in the normal operation state. The "normal" here means a state in which basic performance of the device can be secured, On the other hand, if it is determined not to be in the normal range, the process proceeds to S204. The case where it is determined not to be in the normal range is, for example, a case where a luminance level of the entire camera or fluctuation in reception intensity of the radar is outside a predetermined reference range. In S202, when it is detected that a signal value of any of the above-described various devices is not in the normal range, the process proceeds to S204.

Although it is described above that the block 402 is monitoring the signal from the device in S201, another configuration may be used. For example, when the fluctuation in the reception intensity of the radar is outside the predetermined reference range, a code for identifying its contents may be stored in a memory, and the block 402 may acquire the code. In S202, the process may proceed to S204 if such a code is acquired.

In S204, the block 402 determines whether a predetermined time has passed. When it is determined that the predetermined time has passed, the block 402 determines, in S205, that the device is not in the normal operation state, and ends the process of FIG. 6. When it is determined that the predetermined time has not passed in S204, the process in S202 is repeated.

The signal value of the device may temporarily deviate from the normal range depending on the speed of the vehicle V or an external situation, for example, an atmospheric condition or an unexpected shielding object. By providing the determination of the predetermined time in S204, an erroneous determination due to such a transient signal value can be prevented.

When it is determined that the device is in the normal operation state in S203 of FIG. 6, it is determined that the device is in the normal operation state in S102 of FIG. 5A. On the other hand, when it is determined that the device is not in the normal operation state in S205 of FIG. 6, it is determined that the device is not in the normal operation state in S102 of FIG. 5A.

In S103, the block 402 causes the device determined not to be in the normal operation state to start a self-diagnosis process. The self-diagnosis process will be described later in FIG. 9. When the self-diagnosis process is started, the block 402 determines whether the automated driving control state currently being executed is the state 3 in S104. Here, when it is determined to be the state 3, the process proceeds to S301 of FIG. 7, whereas when it is determined not to be the state 3, the process proceeds to S105.

The process of FIG. 7 will be described. In S301, the block 402 requests the driver to switch to the manual driving control (takeover request). In S301, for example, a message such as "Switch to the manual driving control" is displayed on the HMI 407. Alternatively, at the time of the display, another notification method such as an announcement may be performed to make it easier for the driver to notice.

In S302, the block 402 determines whether the driver has taken over. When it is determined that the driver has taken over, the process proceeds to S303, whereas when it is determined that the driver has not taken over, the process proceeds to S304. For example, when the driver has held and operated the steering wheel or the driver has accelerated/decelerated, it is determined that the driver has taken over. In S303, the block 402 switches the traveling of the vehicle to the manual driving control, and then ends the process of FIG. 7. On the other hand, in S304, the block 402 performs the later-described alternative control, and then ends the process of FIG. 7. For example, after the takeover request in S301, when the predetermined time has passed without having any operation like the above performed, it may be determined in S302 that no takeover has been performed.

Figure 8:
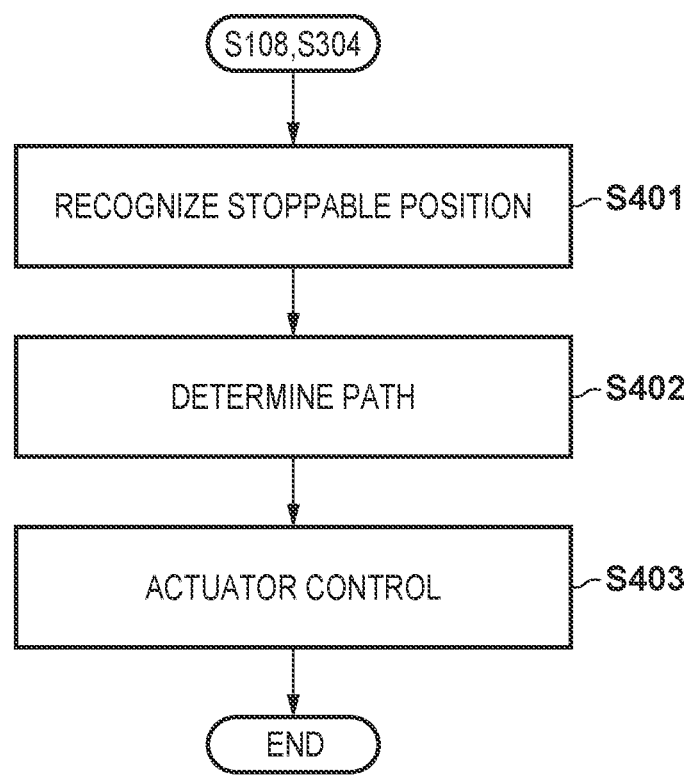
FIG. 8 is a flowchart showing an alternative process.

FIG. 8 is a flowchart showing the alternative process in S304. In S401, the block 402 recognizes a stoppable position. For example, the block 402 recognizes a road shoulder as a stoppable position with the lowest risk based on the map information and information by the GPS sensor, the gyro sensor, and the device determined to be in the normal operation state. In S402, the block 402 determines a path to the stoppable position and determines a control amount of the actuator. In S403, the block 403 controls the block 404 based on the determined control amount of the actuator. Then, it ends the process of FIG. 8.

As described above, in a case where it is determined that any of the devices that recognize the environment outside the vehicle V is not in the normal operation state, if the current automated driving control state is the state 3, at the time point when the self-diagnosis process of the device is started, the driver is requested to take over without waiting for results of the self-diagnosis process. Such a configuration allows the driver to be requested to take over early without waiting for the results of the self-diagnosis process when a symptom of performance deterioration of the device is detected during the automated driving control in the state 3.

FIG. 5A is referred to again. When the driving control state currently being executed is not the state 3 in S104, the process proceeds to S105. In S105, the block 402 determines whether the self-diagnosis process has ended. When it is determined that the self-diagnosis process has not ended, the process from S104 is repeated. When it is determined that the self-diagnosis process has ended, the process proceeds to S106 of FIG. 5B. In the embodiment, when the process from S104 is repeated (when the self-diagnosis process has been started), for example, the automated driving control in the state 2-2 is continued unlike the case of the state 3. However, even if a congestion scene occurs during the automated driving control in the state 2-2, transition to the state 3 is prohibited. Such a configuration allows transition to a higher state to be prohibited while the operation state of the device is unknown.

When it is determined in S105 that the self-diagnosis process has ended, the process proceeds to S106 of FIG. 5B. In S106, the block 402 determines results of the self-diagnosis process started in S103. Hereinafter, the self-diagnosis process of the device will be described.

FIG. 9 is a flowchart showing the self-diagnosis process of the device that recognizes the environment outside the vehicle V. The process of FIG. 9 is implemented by, for example, executing a self-diagnosis program stored in a predetermined memory. Results of the process of FIG. 9, that is, diagnosis results in S508, S507, and S509 are notified to the block 402.

In S501, axis deviation of the device is measured. For example, in the case of the millimeter wave radar or the like, this may be configured such that a reflector is installed in an area with a predetermined irradiation angle or more, and reception intensity of a reflected wave changes remarkably when the radar's axis deviates by a predetermined amount or more. Moreover, in order to detect temperature abnormality, temperature of the device is measured in S502, and in order to detect voltage abnormality, voltage of the device is measured in S503. For example, internal temperature of the device may be measured in S502, and supply voltage to the device may be measured in S503.

In S504, it is determined whether at least one of the measured temperature and the measured voltage is outside a proper range. Here, when it is determined that at least one is outside the proper range, the process proceeds to S509, and the device is determined to be in a performance deteriorated state. On the other hand, when it is determined that both of the measured temperature and the measured voltage are in the proper range, the process proceeds to S505.

In S505, it is determined whether the axis deviation has occurred. When it is determined that the axis deviation has not occurred, the process proceeds to S508, and the device is determined to be in the normal state. On the other hand, when it is determined that the axis deviation has occurred, the process proceeds to S506, and it is determined whether the axis deviation is within an allowable range in which basic performance of the device is secured. This may be determined based on, for example, whether the signal value is within a correctable range. When it is determined to be within the allowable range, the process proceeds to S507, and the device is determined to be in a temporary performance deteriorated state. That is, the temporary performance deteriorated state in the embodiment means a state in which there is a possibility that the performance deteriorated state may be easily caused by an external impact or the like although the basic performance of the device can be secured. On the other hand, when it is determined not to be within the allowable range, the process proceeds to S509, and the device is determined to be in the performance deteriorated state. After S508, S507, and S509, the process of FIG. 9 ends.

When it is determined to be in the normal state in S508, the process proceeds from S106 of FIG. 5B to S109. When it is determined to be in the temporary performance deteriorated state in S507, the process proceeds from S106 to S110. When it is determined to be in the performance deteriorated state in S509, the process proceeds from S106 to S107.

The case where the device is in the temporary performance deteriorated state as results of the self-diagnosis process of FIG. 9 will be described. In that case, a process of FIG. 7 will be performed. It should be noted that, in the case of the state 2-2, in S301 of FIG. 7, the block 402 may display notification that prompts device inspection or the like together with the takeover request on the HMI 407. It should be noted that, in the case of the state 2-1, the steering wheel is held and the driver can immediately intervene in an emergency, so the takeover does not have to be performed. Such a configuration allows the driver to recognize a potential defect of the device. On the other hand, when the automated driving control state is the state 1, the longitudinal control or the lateral control is terminated. After S110, the process of FIG. 5B ends.

As the results of the self-diagnosis process of FIG. 9, when the device is in the performance deteriorated state, the block 402 notifies the performance deterioration of the device on the HMI 407 in S107. Moreover, in S108, the block 402 restricts functions of the automated driving control. When the automated driving control state at that time point is the state 2-2 or the state 2-1, a process of FIG. 8 is performed. In S108, a message such as device replacement or repair may be notified together with the notification of the performance deterioration of the device. On the other hand, when the automated driving control state is the state 1, the longitudinal control or the lateral control is terminated. It should be noted that, also in the case of the state 1, a message such as device replacement or repair is notified together with the notification of the performance deterioration of the device. After S108, the process of FIG. 5B ends.

As the results of the self-diagnosis process of FIG. 9, when the device is in the normal operation state, the block 402 continues the current automated driving control in S109. Then, the process of FIG. 5B ends.

Figure 7:
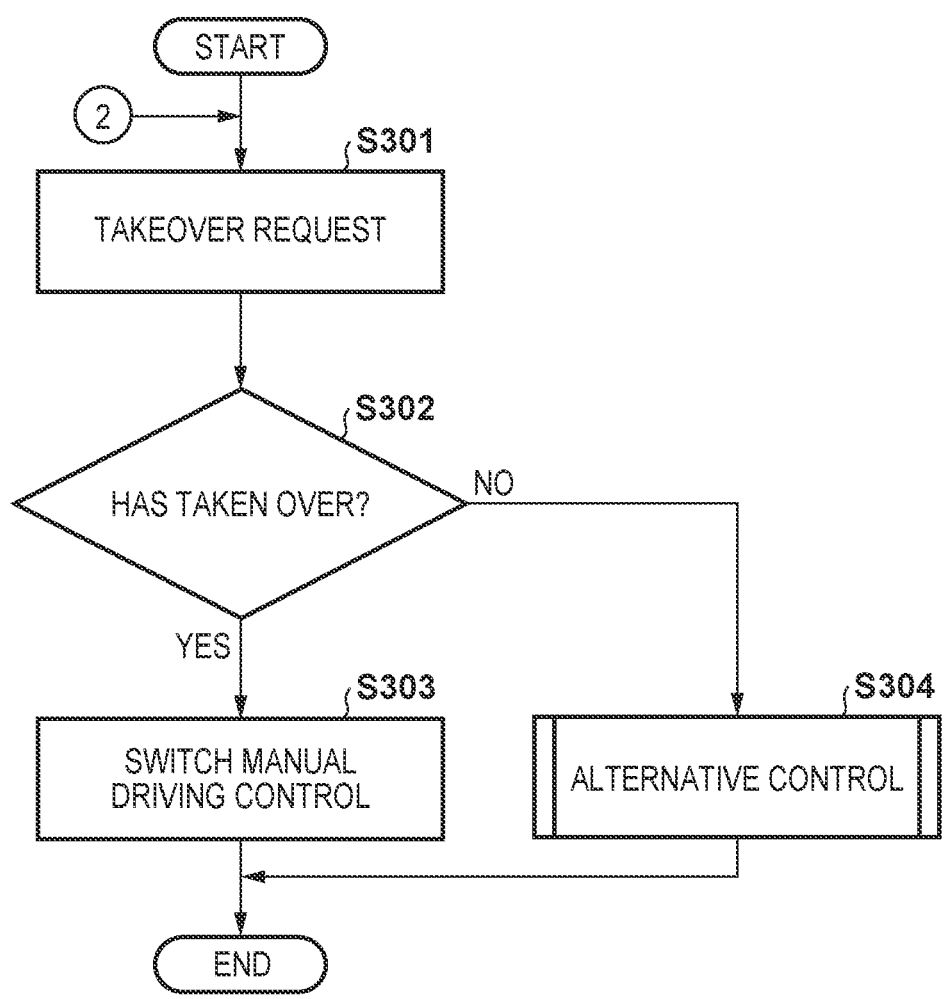
FIG. 7 is a flowchart showing a process of switching to manual driving control.

After switching to the manual driving control in S303 of FIG. 7, the device may be determined to be in the normal operation state as the results of the self-diagnosis process. Operation in that case will be described below with reference to FIG. 10.

Figure 10:
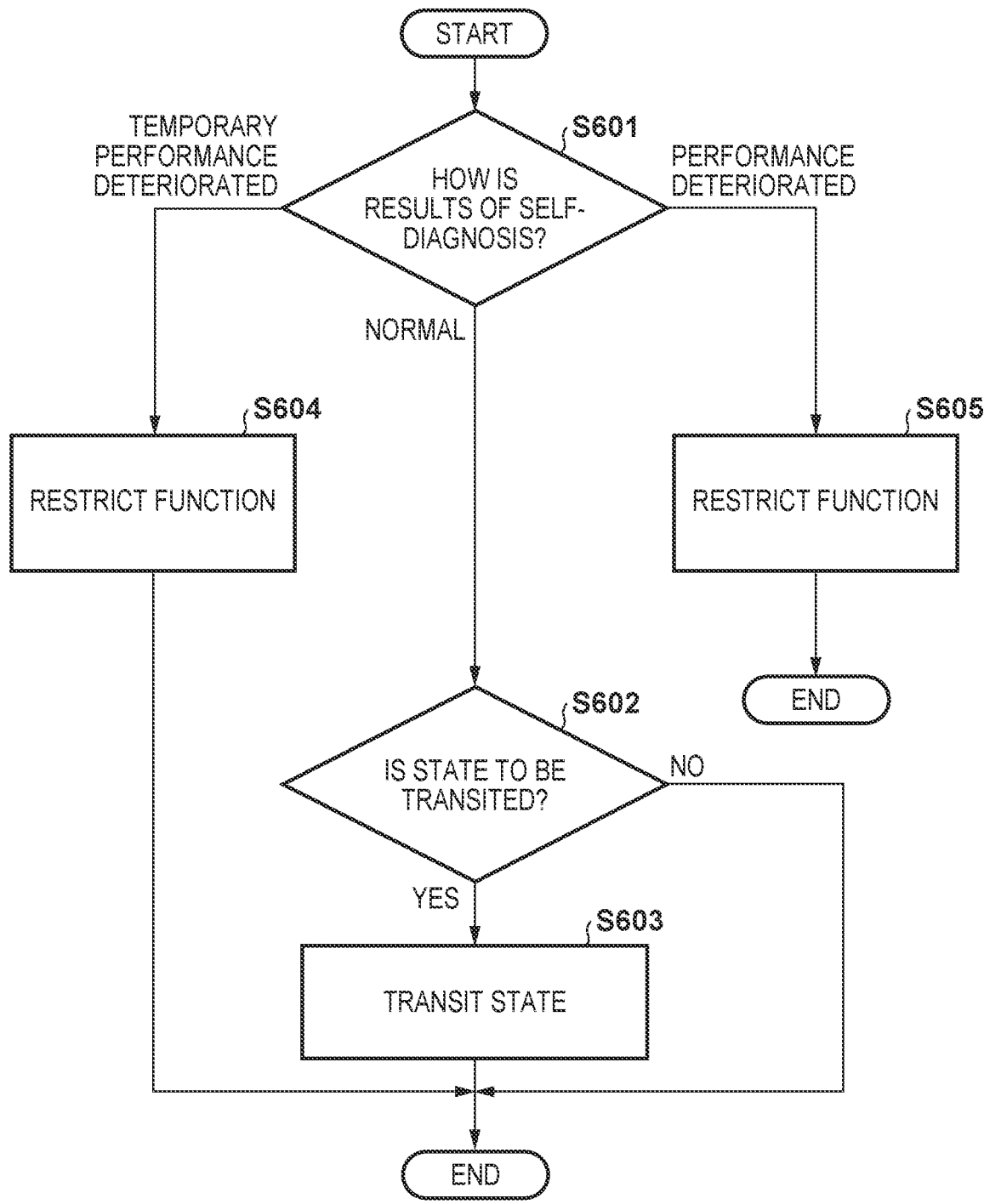
FIG. 10 is a flowchart showing a process after switching to the manual driving control.

FIG. 10 is a flowchart showing a process after switching to the manual driving control in S303. The process of FIG. 10 is performed when the manual driving control is being performed after S303.

As the results of the self-diagnosis process in S601, when the device is in the temporary performance deteriorated state, the block 402 maintains the current manual driving control and also prohibits transition to the automated driving control state in S604. Then, the process of FIG. 10 ends.

As the results of the self-diagnosis process, when the device is in the performance deteriorated state, the process proceeds to S605, the block 402 maintains the current manual driving control and also prohibits transition to the automated driving control state as in S604. Then, the process of FIG. 10 ends.

As the results of the self-diagnosis process in S601, when the device is in the normal state, the block 402 proceeds to S602. In S602, the block 402 determines whether it transits to the automated driving control state. This determination is made, for example, according to a scene in which the vehicle V is currently traveling, which is determined based on the recognition result of the block 401. When it is determined that it transits to the automated driving control state in S602, the block 402 transits to an automated driving control state corresponding to the scene in which the vehicle V is currently traveling in S603, and then ends the process of FIG. 10. On the other hand, when it is determined that it does not transit to the automated driving control state in S602, the block 402 keeps the current manual driving control, and then ends the process of FIG. 10.

<Summary of Embodiment>

The travel control device of each embodiment described above is a travel control device that controls travel of a vehicle, and comprises a device that acquires external information of a vehicle (camera 31A, camera 31B, radar 32B, and lidar 32A), a travel control unit configured to control travel of the vehicle using an acquisition result by the device (ECU 29A and ECU 20A), a diagnosis start unit configured to start a diagnosis process of the device (S103), and a restriction unit configured to restrict a function of travel control of the vehicle after the diagnosis process of the device is started by the diagnosis start unit according to a state of travel control of the vehicle before the diagnosis process of the device is started (S104, and FIG. 7).

With such a configuration, for example, when the diagnosis process of the device is started, the function of travel control of the vehicle can be restricted depending on the state of travel control of the vehicle.

The state of travel control of the vehicle includes a first state and a second state in which a driver is more involved than in the first state, and restriction on the function of travel control of the vehicle by the restriction differs between a case where the state of travel control of the vehicle is the first state and a case where the state is the second state.

With such a configuration, the restriction on the function can be differed according to difference of the state of travel control of the vehicle.

When the first state is a state in which the vehicle drives and the driver is not obliged to monitor the surroundings, the restriction unit restricts the function of travel control of the vehicle before the diagnosis process of the device ends. The restriction unit requests the driver to take over as restriction on travel control of the vehicle. With such a configuration, it is possible to request the driver to take over early in the state in which the vehicle drives and the driver is not obliged to monitor the surroundings.

The travel control device further comprises a determination unit configured to determine whether the driver has taken over, and the restriction unit causes transition to the manual driving control when the determination unit determines that the driver has taken over, and performs alternative control when the determination unit determines that the driver has not taken over. The restriction unit stops the vehicle as the alternative control.

With such a configuration, for example, after the request for takeover, when takeover is not performed within a predetermined time, the vehicle can be stopped.

After the transition to the manual driving control by the restriction unit, if a result of the diagnosis process of the device satisfies a condition, the restriction unit releases the restriction on the function of travel control of the vehicle (S601, S602, S603). After the release of the restriction on the function of travel control of the vehicle by the restriction unit, the travel control unit controls the travel of the vehicle using an acquisition result by the device (S602, S603).

With such a configuration, it is possible to perform automated driving control again, for example, when a diagnosis result of the device indicates a normal operation state after takeover.

After the transition to the manual driving control by the restriction unit, if a result of the diagnosis process of the device does not satisfy a condition, the restriction unit prohibits the travel control of the vehicle by the travel control unit (S601, S604, S605).

With such a configuration, it is possible to prohibit driving support control, for example, when the diagnosis result of the device indicates a performance deteriorated state after takeover.

If the state of travel control of the vehicle is the second state, the restriction unit restricts the function of travel control of the vehicle after the diagnosis process of the device ends. In addition, the restriction unit stops a driving support function as the restriction on travel control of the vehicle.

With such a configuration, it is possible to stop the driving support function, for example, according to a performance deteriorated state of the device as a result of the diagnosis process of the device when the driving support control is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A travel control device for controlling travel of a vehicle, the travel control device comprising:
   a device that acquires external information of a vehicle;
   at least one processor circuit with a memory comprising instructions, that when executed by the processor circuit, causing the processor circuit to at least:
   control travel of the vehicle using an acquisition result by the device;
   start a diagnosis process of the device; and
   restrict a function of travel control of the vehicle after the diagnosis process of the device is started according to a state of travel control of the vehicle before the diagnosis process of the device is started,
   wherein the state of travel control of the vehicle includes a first state and a second state, the second state including at least one added requirement that a driver monitor a surrounding environment of the vehicle or grasp a steering wheel relative to the first state,
   if the state of travel control of the vehicle is the first state and the diagnosis process of the device is started, the function of travel control of the vehicle is restricted without using a result of the diagnosis process of the device, and if the state of travel control of the vehicle is the second state and the diagnosis process of the device is started, the function of travel control of the vehicle is restricted using a result of the diagnosis process of the device,
   when the first state is a state in which the vehicle drives and the driver is not obliged to monitor the surroundings, the function of travel control of the vehicle is restricted before the diagnosis process of the device ends.

2. The travel control device according to claim 1, wherein, the processor circuit is caused to request the driver to take over as restriction of travel control of the vehicle.

3. The travel control device according to claim 2, wherein the processor circuit is caused to determine whether the driver has taken over,
   wherein the processor circuit is caused to cause transition to manual driving control when it is determined that the driver has taken over, and perform alternative control when it is determined that the driver has not taken over.

4. The travel control device according to claim 3, wherein, after the transition to the manual driving control, if the result of the diagnosis process of the device does not satisfy the condition, the processor circuit is caused to prohibit the travel control of the vehicle.

5. The travel control device according to claim 3, wherein, the processor circuit is caused to stop the vehicle as the alternative control.

6. The travel control device according to claim 3, wherein, after the transition to the manual driving control, if a result of the diagnosis process of the device satisfies a condition, the processor circuit is caused to release the restriction on the function of travel control of the vehicle.

7. The travel control device according to claim 6, wherein, after the release of the restriction on the function of travel control of the vehicle, the processor circuit is caused to control the travel of the vehicle using an acquisition result by the device.

8. The travel control device according to claim 1, wherein, if the state of travel control of the vehicle is the second state, the processor circuit is caused to restrict the function of travel control of the vehicle after the diagnosis process of the device ends.

9. The travel control device according to claim 8, wherein, the processor circuit is caused to stop a driving support function as restriction on travel control of the vehicle.

10. The travel control device according to claim 1, wherein the device includes at least any of a camera, a lidar, and a radar.

11. A travel control method executed by a travel control device that controls travel of a vehicle, the method comprising:
    controlling travel of the vehicle using an acquisition result by a device that acquires external information of the vehicle;
    starting a diagnosis process of the device; and
    restricting a function of travel control of the vehicle according to a state of travel control of the vehicle before the diagnosis process of the device is started after the diagnosis process of the device is started,
    the state of travel control of the vehicle includes a first state and a second state, the second state including at least one added requirement that a driver monitor a surrounding environment of the vehicle or grasp a steering wheel relative to the first state,
    if the state of travel control of the vehicle is the first state and the diagnosis process of the device is started, the function of travel control of the vehicle is restricted without using a result of the diagnosis process of the device, and if the state of travel control of the vehicle is the second state and the diagnosis process of the device is started, the function of travel control of the vehicle is restricted using a result of the diagnosis process of the device,
    when the first state is a state in which the vehicle drives and the driver is not obliged to monitor the surroundings, the function of travel control of the vehicle is restricted before the diagnosis process of the device ends.

12. A non-transitory computer-readable storage medium storing a program for causing a computer to:
    control travel of the vehicle using an acquisition result by a device that acquires external information of the vehicle;
    start a diagnosis process of the device; and
    restrict a function of travel control of the vehicle according to a state of travel control of the vehicle before the diagnosis process of the device is started after the diagnosis process of the device is started in the diagnosis start step,
    the state of travel control of the vehicle includes a first state and a second state, the second state including at least one added requirement that a driver monitor a surrounding environment of the vehicle or grasp a steering wheel relative to the first state,
    if the state of travel control of the vehicle is the first state and the diagnosis process of the device is started, the function of travel control of the vehicle is restricted without using a result of the diagnosis process of the device, and if the state of travel control of the vehicle is the second state and the diagnosis process of the device is started, the function of travel control of the vehicle is restricted using a result of the diagnosis process of the device,
when the first state is a state in which the vehicle drives and the driver is not obliged to monitor the surroundings, the function of travel control of the vehicle is restricted before the diagnosis process of the device ends.

* * * * *